United States Patent
Brzenchek et al.

(10) Patent No.: US 6,494,520 B2
(45) Date of Patent: Dec. 17, 2002

(54) VEHICLE TAILGATE LIMITER SYSTEM

(75) Inventors: David John Brzenchek, Canton, MI (US); Gregory Francis Kuhn, Dexter, MI (US); Neal David Lipman, Virginia Beach, VA (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,526

(22) Filed: Apr. 24, 2001

(65) Prior Publication Data

US 2002/0153739 A1 Oct. 24, 2002

(51) Int. Cl.[7] .................. B62D 25/12; B62D 33/03; B60P 1/26; E06B 7/00; E05D 11/00
(52) U.S. Cl. .................. 296/57.1; 296/50; 49/384; 16/DIG. 6
(58) Field of Search .................. 296/57.1, 50, 58, 296/59, 60; 49/383, 384; 16/86 A, 86 B, 86 C, DIG. 6

(56) References Cited

U.S. PATENT DOCUMENTS

| | | | | |
|---|---|---|---|---|
| 907,768 A | * | 12/1908 | Fromhart | 296/57.1 |
| 1,066,464 A | * | 7/1913 | Carr | 296/57.1 |
| 1,242,035 A | * | 10/1917 | Pierson et al. | 296/57.1 |
| 1,892,374 A | * | 12/1932 | Ritz Woller | 49/383 |
| 3,306,655 A | * | 2/1967 | Voehringer | 296/57.1 |
| 4,063,330 A | * | 12/1977 | Triplette | 16/321 |
| 4,435,921 A | * | 3/1984 | Marin | 49/383 |
| 5,174,632 A | | 12/1992 | Hagenbach et al. | |
| 5,249,843 A | | 10/1993 | Hagenbach et al. | |
| 5,474,363 A | | 12/1995 | Hagenbach | |
| 5,626,384 A | * | 5/1997 | Walther | 296/155 |
| 5,707,095 A | * | 1/1998 | Pribak et al. | 296/57.1 |
| 5,791,723 A | * | 8/1998 | Bell et al. | 16/86 B |
| 5,924,753 A | | 7/1999 | DiBassie | |
| 5,997,067 A | * | 12/1999 | Shambeau et al. | 296/57.1 |
| 6,048,018 A | * | 4/2000 | Shambeau et al. | 296/57.1 |
| 6,113,173 A | * | 9/2000 | Leitner et al. | 296/57.1 |
| 6,279,979 B1 | * | 8/2001 | Cauley | 296/57.1 |
| 6,402,215 B1 | * | 6/2002 | Leitner et al. | 296/57.1 |

* cited by examiner

*Primary Examiner*—D. Glenn Dayoan
*Assistant Examiner*—H Gutman
(74) *Attorney, Agent, or Firm*—Gigette Bejin

(57) ABSTRACT

A vehicle tailgate limiter system for a vehicle includes a cargo bed, a tailgate pivotally attached to the cargo bed operable between a closed vertical position and a deployed horizontal position, a fixed pin having a head portion and a base portion, and a slotted bracket having a middle portion and end portions adapted to receive the pin when the tailgate is in the deployed position.

14 Claims, 2 Drawing Sheets

VEHICLE TAILGATE LIMITER SYSTEM

BACKGROUND OF INVENTION

The present invention relates to tailgate assemblies, and more specifically, to a vehicle tailgate limiter system.

Certain pickup trucks provide the comfort of a sport utility vehicle while still maintaining the functionality of a pickup. To allow for the roominess and sport utility-like feel, the box or bed length is shortened and this length is then added to the cab portion of the truck. However, this shorter bed length is problematic when larger loads need to be transported. To solve this problem, a bed extender was designed to extend the length of the bed. When the bed extender is used, the tailgate is deployed thus providing extra bed length, and the bed extender retains the load.

In utilizing such a bed extender, however, problems occur with the tailgate. Traditional vehicle tailgates are designed with a hinge mechanism used for opening and closing the tailgate when the vehicle is parked and when loading and unloading cargo is desired. Because vehicle tailgates are typically closed when the vehicle is in motion, only minimal lateral tailgate movement was anticipated. This lateral movement is compensated for and constrained by the pillars and catches at the topsides of the cargo bed. Therefore, typical hinge mechanisms support the tailgate in a vertical plane, as lateral movement doesn't occur when the vehicle is stationary. However, because the tailgate is deployed while the bed extender is used and the vehicle is in motion, extreme lateral movement of the tailgate occurs, thus resulting in the destruction and loss of function of the tailgate.

It would therefore be beneficial to have a tailgate limiter system that constrains lateral movement of the tailgate when deployed and the vehicle is in motion, while still retaining the functionality of the tailgate itself.

SUMMARY OF INVENTION

It is an object of the present invention to provide a vehicle tailgate limiter system that overcomes the disadvantages of the prior art.

It is a feature of the present invention that the vehicle tailgate limiter system includes a fixed pin and a slotted bracket thereby allowing full functionality of the tailgate while constraining lateral movement of the tailgate when deployed.

The present invention advantageously provides a vehicle tailgate limiter system for a vehicle including a cargo bed, a tailgate pivotally attached to the cargo bed operable between a closed vertical position and a deployed horizontal position, a fixed pin having a head portion and a base portion, and a slotted bracket having a middle portion and end portions adapted to receive the pin when the tailgate is in the deployed position.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
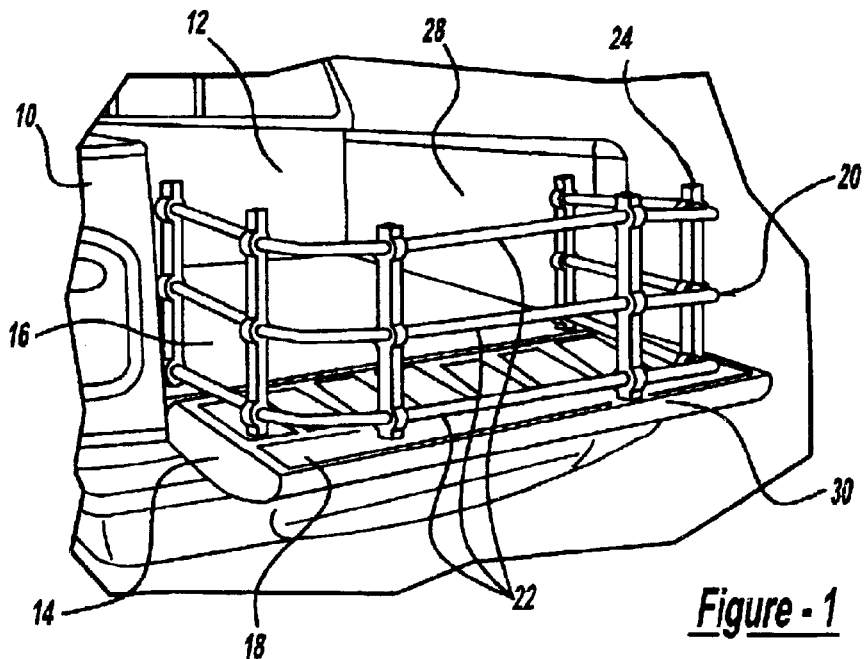
FIG. 1 is a perspective view of a vehicle bed with a deployed tailgate and bed extender according to the present invention.

In FIG. 1, a pickup truck 10 having a bed 12 and a tailgate 14 is shown. The bed 12 has a floor 16 that is a substantially flat, planar surface. The tailgate 14 has an inner surface 18 that is substantially flat so as to be flush with the floor 16 of the bed 12 when the tailgate 14 is in a deployed horizontal position.

A bed extender 20 is also shown. The bed extender 20 consists of a plurality of unshaped bars 22 that serve to retain a load in the bed 12. The bars 22 are spaced a predetermined distance apart and are held in place by a plurality of vertical spacers 24 a predetermined distance apart. The two front-most vertical spacers 24 of the bed extender 20 are attached to inner sides 28 of the bed 12. The rear-most vertical spacers 24 are attached to an inner surface 18 of the tailgate 14 at an edge 30 of the tailgate 14.

In using the bed extender 20, the tailgate 14 is deployed to the horizontal position as shown, thereby providing extra length in the bed 12. The bed extender 20 then serves to retain the load in the bed 12, thereby performing the function normally performed by the closed tailgate 14. When extra cargo space is not required, the bed extender 20 can be removed and the tailgate 14 can be raised into a closed vertical position.

Figure 2:
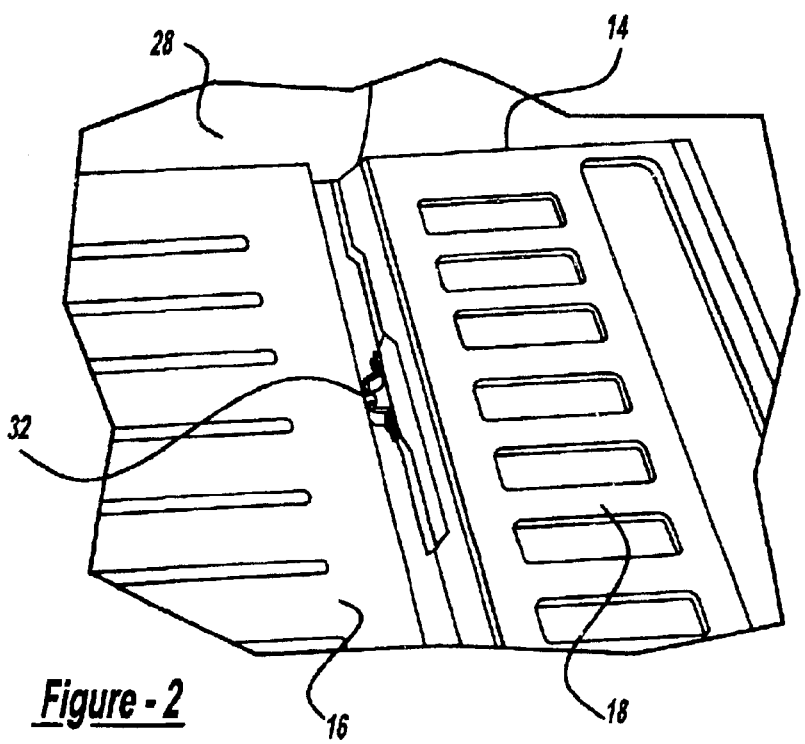
FIG. 2 is a perspective view of a vehicle tailgate limiter system with a deployed tailgate according to the present invention.

FIG. 2 shows a vehicle tailgate limiter system 32. Here, the tailgate 14 is in the deployed horizontal position. In this position, the vehicle tailgate limiter system 32 is engaged, thereby allowing for tailgate 14 functionality, as well as constraining lateral movement of the tailgate 14 while the vehicle 10 is in motion.

Figure 3:
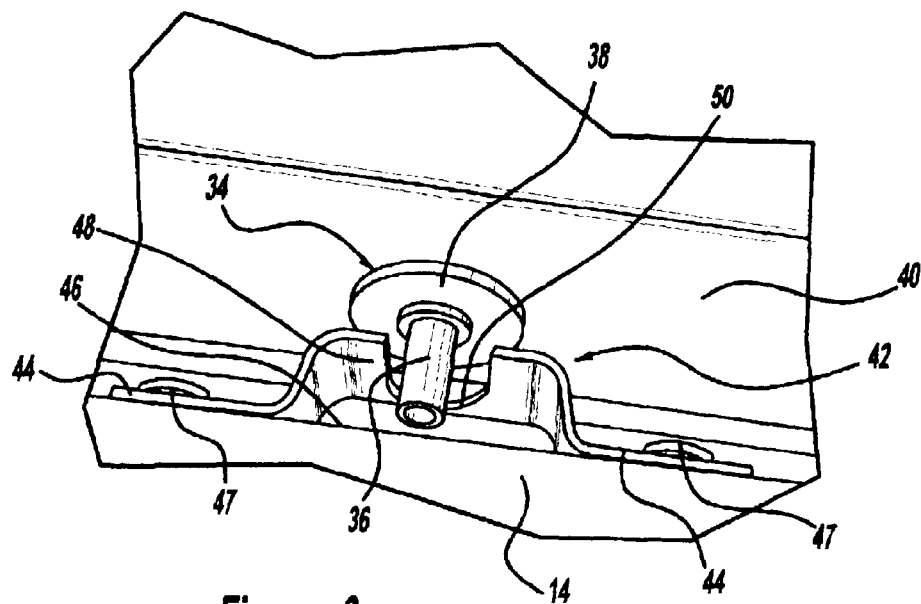
FIG. 3 is a perspective view of a vehicle tailgate limiter system engaged according to the present invention.

A closer look at the components of the vehicle tailgate limiter system 32 can be seen in FIG. 3. The first component is a fixed pin 34. The pin 34 has a head portion 36 and a base portion 38. The head portion 36 is cylindrical shaped and extends outward a predetermined distance from the base portion 38. The base portion 38 is circular shaped and is fixed onto a rear sill 40 of the bed 12.

The second component of the vehicle tailgate limiter system 32 is a slotted bracket 42. The slotted bracket 42 has two end portions 44 that are substantially flat and are flush with and connected to an inner edge 46 of the tailgate 14. The end portions 44 are held to the inner edge 46 of the tailgate 14 by bolts 47. The slotted bracket 42 has a middle portion 48 that extends outward from the end portions 44 a predetermined distance. The middle portion 48 of the slotted bracket 42 has a notch 50 in which the head portion 36 of the fixed pin 34 is received when the vehicle tailgate limiter system 32 is engaged. The pin 34 preferably does not contact the notch 50 during normal operating conditions thereby preventing unnecessary rattle. When the vehicle tailgate limiter system 32 is engaged as shown in FIG. 3, the tailgate 14 is in the deployed horizontal position. In this deployed position, the notch 50 of the slotted bracket 42 receives the fixed pin 34. In this position, the fixed pin 34 and slotted bracket 42 combined constrains and prevents excessive lateral movement of the tailgate 14 when the vehicle 10 is in motion.

Figure 4:
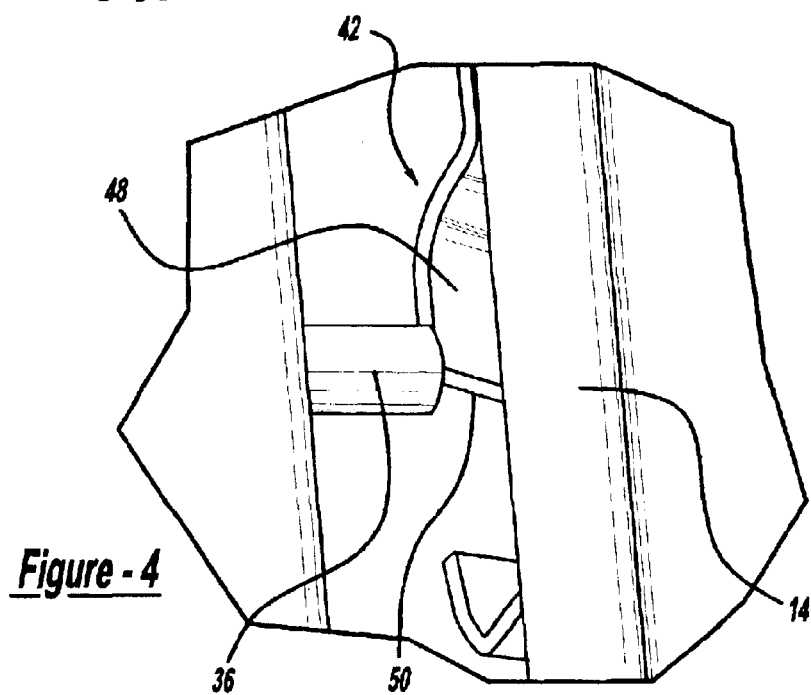
FIG. 4 is a perspective view of a vehicle tailgate limiter system disengaged according to the present invention.

While FIG. 3 shows the vehicle tailgate limiter system 32 in an engaged position thereby limiting excessive lateral movement of the tailgate 14, the system 32 still allows for tailgate 14 functionality as shown in FIG. 4. Here, the tailgate 14 is in a near-vertical closed position, and the head portion 36 of the fixed pin 34 and the notch 50 in the middle portion 48 of the slotted bracket 42 become disengaged. Thus when the tailgate 14 is in the closed vertical position, the vehicle tailgate limiter system 32 is disengaged. Upon opening the tailgate 14, the pin 34 and slotted bracket 42 become engaged, thus preventing excessive lateral movement of the tailgate 14.

While only one embodiment of the vehicle tailgate limiter system of the present invention has been described, others may be possible without departing from the scope of the following claims.

What is claimed is:

1. A vehicle tailgate limiter system for a vehicle comprising:
   a cargo bed;
   a tailgate pivotally attached to the cargo bed operable between a closed vertical position and a deployed horizontal position;
   a fixed pin, fixed to one of the tailgate and the cargo bed, having a longitudinal axis, a head portion, and a base portion;
   a slotted bracket, fixed to the other of the tailgate and the cargo bed, having a middle portion and end portions adapted to receive the pin when the tailgate is in the deployed horizontal position; and
   wherein the longitudinal axis of the fixed pin is substantially parallel to the longitudinal axis of the vehicle, thereby limiting lateral movement of the tailgate when in the deployed horizontal position.

2. The vehicle tailgate limiter system as defined in claim 1, wherein a removable bed extender engages the cargo bed.

3. The vehicle tailgate limiter system as defined in claim 1, wherein a removable bed extender engages the tailgate.

4. The vehicle tailgate limiter system as defined in claim 2 or 3, wherein the bed extender has a plurality of bars a predetermined distance apart.

5. The vehicle tailgate limiter system as defined in claim 2 or 3, wherein the bed extender has a plurality of vertical spacers a predetermined distance apart.

6. The vehicle tailgate limiter system as defined in claim 1, wherein pivoting the tailgate into the deployed horizontal position brings the fixed pin to rest in a notch in the slotted bracket's middle portion, thereby limiting lateral movement of the tailgate when in the deployed horizontal position.

7. A vehicle tailgate limiter system for a vehicle comprising:
   a cargo bed;
   a tailgate pivotally attached to the cargo bed operable between a closed vertical position and a deployed horizontal position;
   a fixed pin, fixed to one of the tailgate and the cargo bed, having a head portion and a base portion;
   a slotted bracket, fixed to the other of the tailgate and the cargo bed, having a middle portion and end portions adapted to receive the pin when the tailgate is in the deployed horizontal position;
   a removable bed extender engaging at least the cargo bed; and
   wherein pivoting the tailgate into the deployed horizontal position brings the fixed pin to rest in a notch in the slotted bracket's middle portion, thereby limiting lateral movement of the tailgate when in the deployed horizontal position.

8. The vehicle tailgate limiter system as defined in claim 7, wherein the removable bed extender engages the tailgate.

9. The vehicle tailgate limiter system as defined in claim 7, wherein the bed extender has a plurality of bars a predetermined distance apart.

10. The vehicle tailgate limiter system as defined in claim 7, wherein the bed extender has a plurality of vertical spacers a predetermined distance apart.

11. A vehicle tailgate limiter system for a vehicle comprising:
    a cargo bed;
    a tailgate pivotally attached to the cargo bed operable between a closed vertical position and a deployed horizontal position;
    a fixed pin, fixed to one of the tailgate and the cargo bed, having a longitudinal axis, a head portion, and a base portion carried by the bed;
    a slotted bracket, fixed to the other of the tailgate and the cargo bed, having a middle portion and end portions carried by the tailgate adapted to receive the pin when the tailgate is in the deployed horizontal position;
    a removable bed extender engaging at least the cargo bed; and
    wherein the longitudinal axis of the fixed pin is substantially parallel to the longitudinal axis of the vehicle and pivoting of the tailgate into the deployed horizontal position brings the fixed pin to rest in a notch in the slotted bracket's middle portion, thereby limiting lateral movement of the tailgate when in the deployed horizontal position.

12. The vehicle tailgate limiter system as defined in claim 11, wherein the removable bed extender engages the tailgate.

13. The vehicle tailgate limiter system as defined in claim 11, wherein the bed extender has a plurality of bars a predetermined distance apart.

14. The vehicle tailgate limiter system as defined in claim 11, wherein the bed extender has a plurality of vertical spacers a predetermined distance apart.

* * * * *